May 25, 1954
I. NESSON
2,679,066
WIPER BLADE CONNECTOR
Filed Nov. 8, 1950
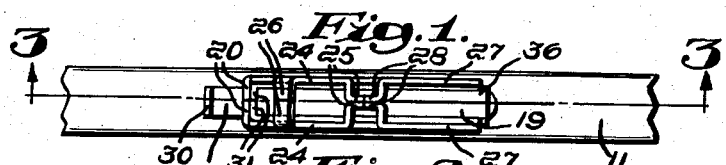
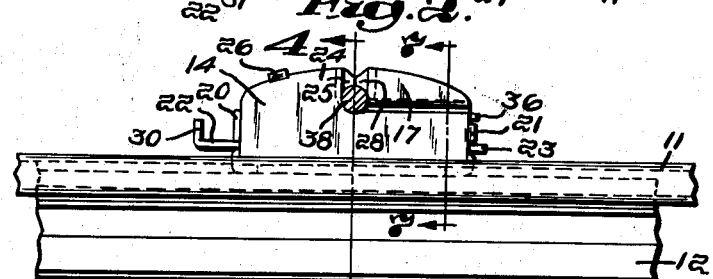
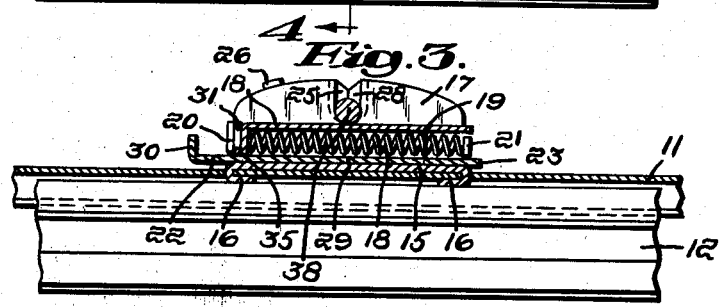
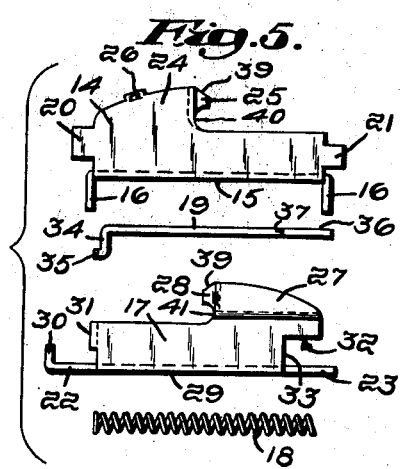
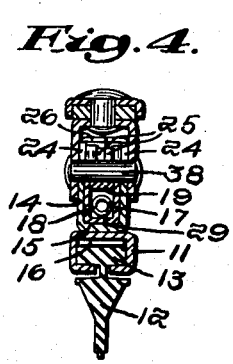
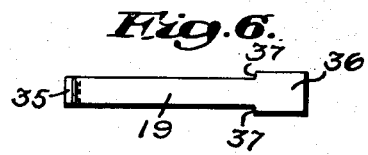
Inventor:
Israel Nesson,
by Thomson & Thomson
Attorneys Patented May 25, 1954

2,679,066

UNITED STATES PATENT OFFICE 2,679,066

WIPER BLADE CONNECTOR

Israel Nesson, Lynn, Mass., assignor to
Max Zaiger, Swampscott, Mass.

Application November 8, 1950, Serial No. 194,598

5 Claims. (Cl. 15—250)

This invention relates to connectors carried by windshield wiper blades for separably attaching the blade to a wiper arm, and pertains more particularly to improvements in a blade connector for securing the cross pin or bar of a pin-type wiper arm. The principal purpose of the invention is to provide a connector of simple and economical construction which may be readily fixed to the blade holder and which has relatively movable elements carrying one or more retaining fingers yieldingly urged to locking position by a spring or other resilient means contained within the connector, whereby the cross bar at the end of the wiper arm may be inserted between the yielding fingers which thereafter automatically close together over the cross pin and positively lock the bar in the connector, until the fingers are manually opened to permit separation of the connected parts.

A further object of the invention is to provide such a connector in which one set of bar-retaining fingers is integral with a fixed clip element of the connector, and the other set of fingers is integral with a slidable clip element normally urged to locking position by a compression spring concealed within the connector; said slidable clip element preferably having a projecting lever by which said element may be moved to open position.

Further features and advantages of the improved connector will be apparent from the following description of the recommended embodiment of this invention shown in the accompanying drawings, and will be pointed out in the appended claims. It will be understood, however, that the structural details of the devices herein illustrated and described may be varied to suit particular conditions or purposes without departing from the essence of the invention as set forth in said claims.

In the drawings,

Fig. 1 is a fragmentary top view of a windshield wiper blade equipped with the improved connector;

Fig. 2 is a side elevation of Fig. 1 showing the retained cross pin in section;

Fig. 3 is a longitudinal section on line 3—3 of Fig. 1 also showing the cross pin;

Fig. 4 is a transverse section on line 4—4 of Fig. 2 showing the wiper arm end and its cross pin in connected position;

Fig. 5 is an exploded view showing the separated parts of the connector in side elevation;

Fig. 6 is a plan view of a spring retaining bar shown in Fig. 5; and

Fig. 7 is a transverse section on line 7—7 of Fig. 2, the cross pin being omitted.

In the particular embodiment chosen for the purpose of illustration, the improved connector is attached to a windshield wiper blade consisting of a metal shell or holder 11 and a flexible rubber wiper strip 12. The holder 11 is channel-shaped and receives the top bead 13 of the flexible strip 12, as shown in Fig. 4. The precise shape or structure of the blade holder and wiper strip are not material to the present invention.

The connector comprises a stationary clip section 14 having a base 15 attached to the top of the holder 11, as by ears 16 passed through openings in the holder top and crimped thereunder (Fig. 3); a slidable clip section 17 received between the spaced upstanding sides of the fixed clip section 14 and movable longitudinally thereof substantially parallel to the holder 11 a coiled compression spring 18 disposed between the upstanding spaced sides of the slidable clip section and arranged normally to urge said section toward and into the fixed clip section; and a spring retainer 19 fixed in the slidable clip section over the spring 18.

The sides of the fixed clip section 14 are provided at their opposite ends with inwardly projecting tabs 20 and 21, respectively, which meet at their opposed edges partially to close the said ends. Both sets of tabs are spaced above the base 15 of said section, so that the opposite ends 22 and 23 of the base of the slidable section 17 may slide between said tabs and said base 15 and guide the movement of said section. At one end portion of the fixed clip section, the sides thereof extend upwardly to a greater height than the sides at the opposite end of the section, as indicated by the extensions 24; and the inner ends of the extensions 24 are formed with integral retaining fingers 25, bent inwardly from said sides to juxtaposed relation. The tops of the extensions 24 may also have inwardly directed ears 26 which serve as a cross member to receive a hook-type arm which may optionally be attached to the connector.

The sides of the slidable clip section 17 are formed in a complemental fashion with upstanding extensions 27 near one end, said extensions flaring outwardly so that they are disposed substantially in the plane of the respective extensions 24 of the fixed clip section. The inner ends of the extensions 27 are formed with integral, inwardly directed fingers 28, corresponding to the fingers 25 and arranged to engage the latter in butting relation when the clip sections are closed. The base 29 of the sliding clip is moveable along the upper surface of the base 15 of the fixed clip and the end portions 22 and 23 thereof normally project beyond the ends of the closed connector as guides for the movement of the sliding clip. Extension 22 has an upwardly bent flange 30 providing a finger piece or lever by which the slidable clip 17 may be moved to separate the complemental fingers of the connector. At one end of the slidable clip, its sides are provided with inwardly directed tabs 31, spaced above the base extension 22. At the opposite end of clip 17, the sides are cut away to provide recesses 32 and shoulders 33 (Fig. 5).

The coiled spring 18 is disposed between the sides of the movable clip section, one end of the spring engaging the end tabs 21 of the fixed clip section, and the other end of the spring pressing toward the end tabs 31 of the slidable clip section and tending to force the tabs 31 against the end tabs 20 of the fixed clip section. The spring retainer 19 is placed between the sides of the slidable clip section, over the spring 18. One end of said retainer is flanged downwardly at 34 and formed with a hook 35, the flange being disposed between the end tabs 31 and the adjacent end of the spring 18, and the hook 35 engaging under the bottom edges of the tabs 31. The opposite end of the retainer 19 is widened at 36 to provide shoulders 37 which engage against the respective shoulders 33 of the sliding clip, when the widened end of the bar is inserted in the recesses 32. The spring retainer is thus located in place by the hook 35 and the engagement of its widened end 36 in the recesses 32 of the sides of the sliding clip, so that the spring 18 is held in place and substantially enclosed within the connector.

It will be evident that the sliding clip section moves longitudinally between the sides of the fixed clip section and is held against transverse displacement by the base extensions 22 and 23 which slidably engage under the end tabs 21 of the fixed section and under the hook 35 of the spring retaining bar, as best indicated in Fig. 3. It will also be apparent that the clip sections are constantly yieldingly urged to closed position, as shown in the figures, by the action of the compression spring 18. The two sets of fingers 25 and 28 are thus yieldingly held in abutting engagement, but will be separated by inward manual pressure applied to the finger piece or lever 30.

The cross pin 38 of the conventional pin type wiper arm end may be inserted under the closed fingers by separating the same as aforesaid; but it is preferred that the top edges of the respective sets of fingers be downwardly sloped or inclined toward the tips of the fingers, indicated at 39, so that the cross bar or pin 38 may be pressed into locking position between the opposed sets of yielding fingers, without manual operation of the finger piece or release lever 30. The retaining fingers automatically close under action of the spring 18, positively to lock the cross pin to the connector.

The pin or bar of the wiper arm is received in curved sockets 40 and 41, formed in the edges of the side walls of the respective clip sections, so that the pin is held against transverse displacement and provides a smooth pivotal joint between the wiper arm and the improved connector. The pin is quickly released, as aforesaid, by pressing the finger lever 30 inwardly to contract the compression spring and open the latch.

It will be understood that the cross bar of the wiper arm, here shown as a cylindrical pin 38, may take various forms. For example, the cross bar may frame a hole through a portion of the arm end, in which case, the complemental sets of retaining fingers would close within such hole.

I claim:

1. A wiper blade connector comprising a clip section fixed to the blade holder and having spaced upstanding sides, a second clip section slidable longitudinally between the sides of the fixed section and having upstanding sides and a base portion, opposed complemental fingers on at least one of the sides of each section, said fingers being movable into and out of mutual engagement as the slidable clip section is moved longitudinally with respect to the fixed clip section, resilient means disposed between the sides of the movable clip and constantly acting on the respective sections yieldingly to hold said complemental fingers in engagement with each other, whereby the cross bar of a wiper arm is separably connected to the wiper blade by locking said bar under said fingers, said resilient means consisting of a compression spring, a spring retainer separate from and extending longitudinally between the sides of the slidable clip over said spring, and complemental means on the retainer and on the movable clip for holding said retainer in position to enclose said spring within the connector.

2. A wiper blade connector comprising a clip section fixed to the blade holder and having spaced upstanding sides, a second clip section slidable longitudinally between the sides of the fixed section and having upstanding sides and a base portion, opposed complemental fingers on at least one of the sides of each section, said fingers being movable into and out of mutual engagement as the slidable clip section is moved longitudinally with respect to the fixed clip section, resilient means disposed between the sides of the movable clip and acting on the respective sections yieldingly to hold said complemental fingers in engagement with each other, whereby the cross bar of a wiper arm is separably connected to the wiper blade by locking said bar under said fingers, and means preventing transverse displacement of the slidable clip, said means comprising end tabs on the sides of said fixed clip and end extensions on the base portion of the slidable clip movable beneath the respective end tabs, so that said slidable clip moves in a plane substantially parallel to the plane of said blade holder.

3. A wiper blade connector comprising a clip section fixed to the blade holder and having spaced upstanding sides, a second clip section slidable longitudinally between the sides of the fixed section and having upstanding sides and a base portion, opposed complemental fingers on at least one of the sides of each section, said fingers being movable into and out of mutual engagement as the slidable clip section is moved longitudinally with respect to the fixed clip section, resilient means disposed between the sides of the movable clip and acting on the respective sections yieldingly to hold said complemental fingers engaged with each other, whereby the cross bar of a wiper arm is separably connected to the wiper blade by locking said bar under said fingers, said resilient means consisting of a coiled spring, and a spring retainer disposed longitudinally between the sides of the slidable clip, said sides being recessed at one of the clip to provide shoulders, and having inwardly directed tabs at the opposite end of the clip, said retainer having lateral shoulders adjacent one end engaging said side shoulders, and having a downwardly directed hook at its opposite end engaging under said tabs, to hold the retainer in position to enclose the spring in the slidable clip.

4. A wiper blade connector comprising a clip section fixed to the blade holder and having spaced upstanding sides, a second clip section slidable longitudinally between the sides of the fixed section and having upstanding sides and a base portion, opposed complemental fingers on at least one of the sides of each section, said fingers being movable into and out of engagement as the slidable clip section is moved longitudinally with respect to the fixed clip section, resilient means disposed between the sides of the movable clip and acting on the respective sections yieldingly to hold said complemental fingers engaged with each other, whereby the cross bar of a wiper arm is separably connected to the wiper blade by locking said bar under said fingers, said fingers being carried by upward projections of each of the sides of the respective clip sections, and the edges of the respective extensions having rounded sockets disposed beneath said fingers for receiving the inserted cross bar in pivotal relation to the closed connector.

5. A wiper blade connector comprising a clip section fixed to the blade holder and having spaced upstanding sides, a second clip section slidable longitudinally between the sides of the fixed section and having upstanding sides and a base portion, opposed complemental fingers on at least one of the sides of each section, said fingers being movable into and out of engagement as the slidable clip section is moved longitudinally with respect to the fixed clip section, resilient means disposed between the sides of the movable clip and acting on the respective sections yieldingly to hold said complemental fingers engaged with each other, whereby the cross bar of a wiper arm is separably connected to the wiper blade by locking said bar under said fingers, said fingers being carried by upward projections of each of the sides of the respective clip sections, in complemental sets, the fingers of each set being inturned to juxtaposed relation, and the tops of the fingers of each set being downwardly inclined toward the tips thereof, so that the respective sets of fingers are temporarily opened by pressing said cross bar on said inclined tops.

References Cited in the file of this patent

UNITED STATES PATENTS

| Number | Name | Date |
|---|---|---|
| 2,156,506 | Marcolivio | May 2, 1939 |
| 2,270,589 | Hansen | Jan. 20, 1942 |
| 2,432,689 | Smulski | Dec. 16, 1947 |
| 2,432,693 | Anderson | Dec. 16, 1947 |
| 2,443,113 | Nesson | June 8, 1948 |
| 2,616,112 | Smulski | Nov. 4, 1952 |